April 26, 1938.  W. L. MORRISON  2,115,036
VENTILATING DEVICE FOR AUTOMOBILES
Filed July 3, 1933  3 Sheets-Sheet 2
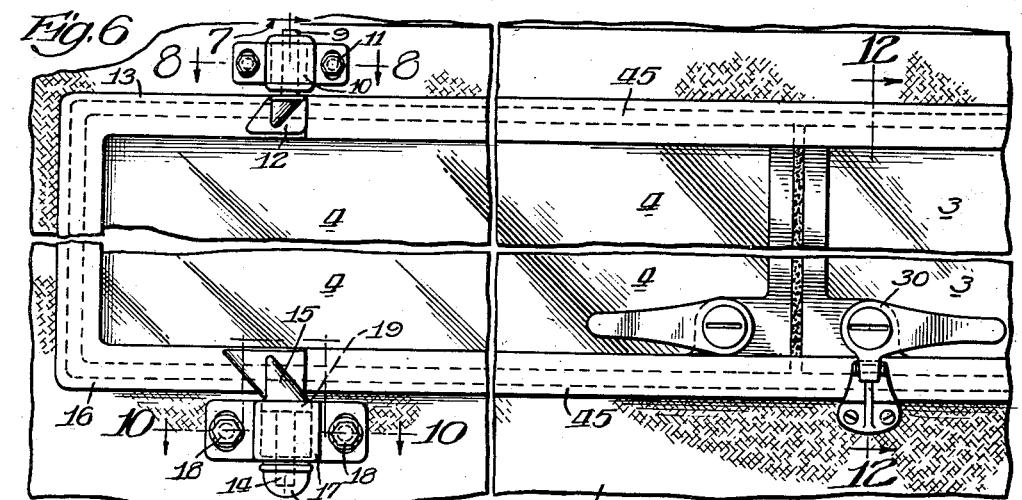
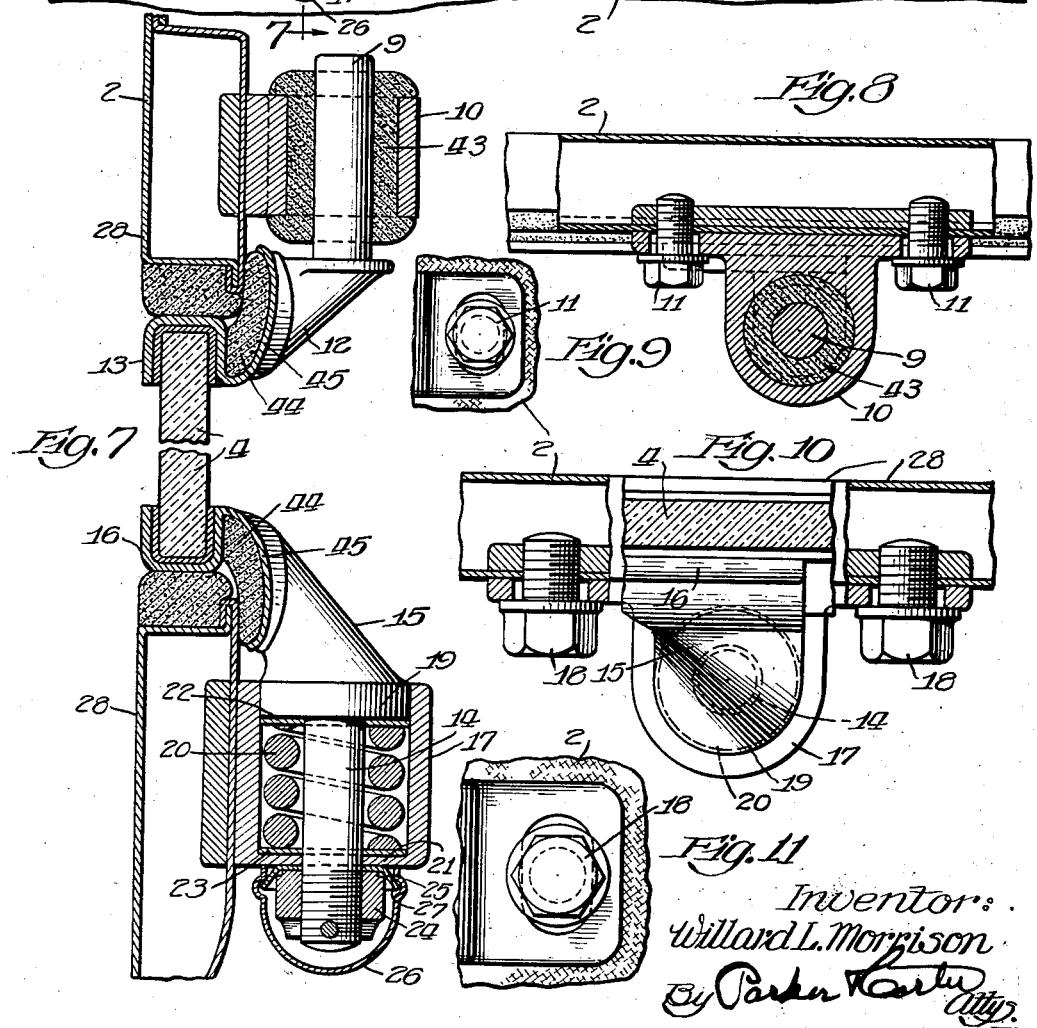
Inventor:
Willard L. Morrison
By Parker Carter Atty.

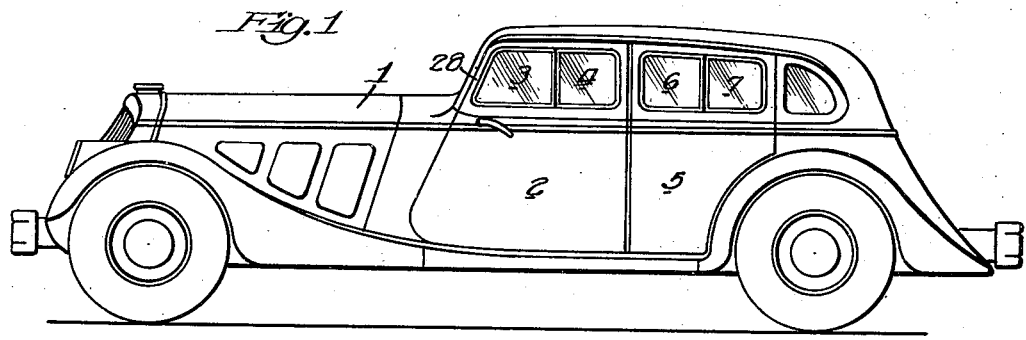
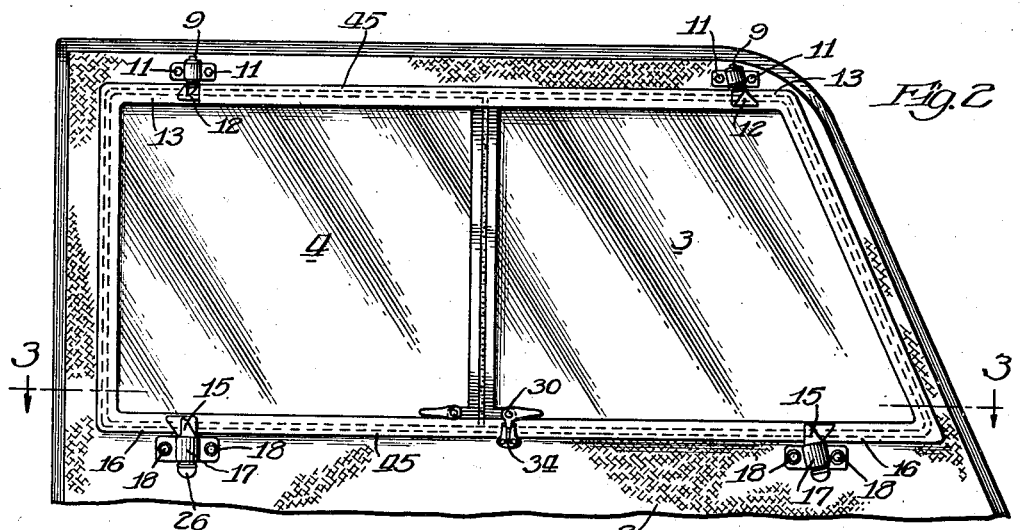
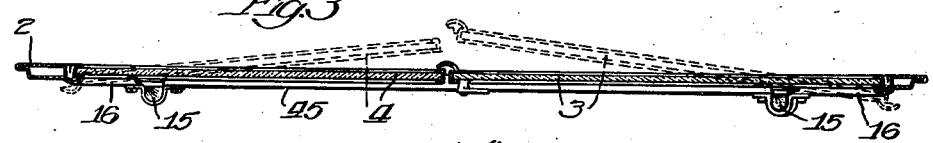
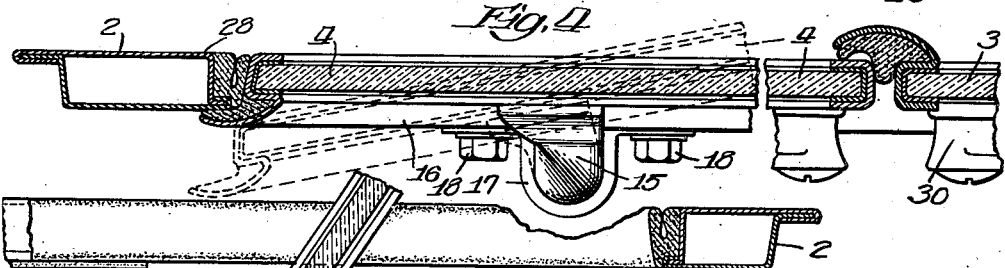
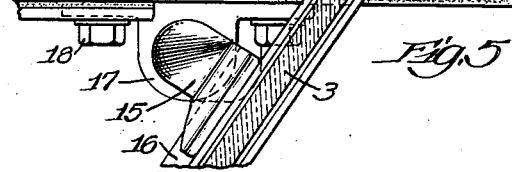

April 26, 1938. W. L. MORRISON 2,115,036
VENTILATING DEVICE FOR AUTOMOBILES
Filed July 3, 1933 3 Sheets-Sheet 3
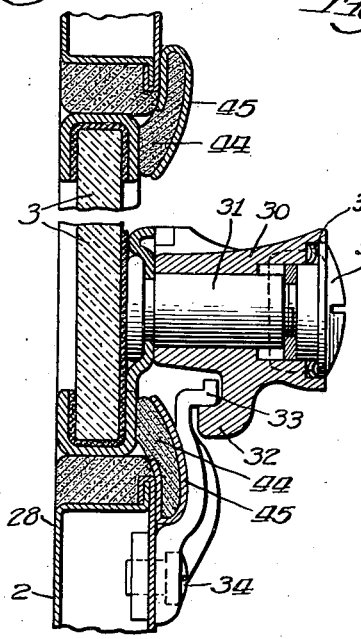
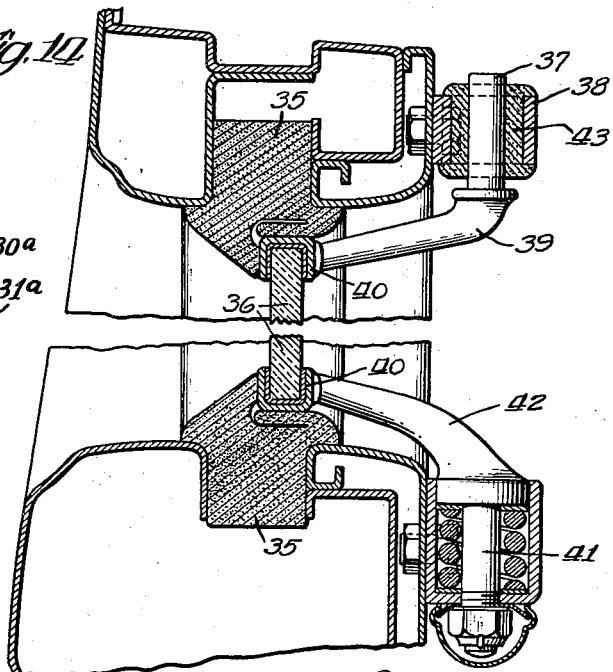
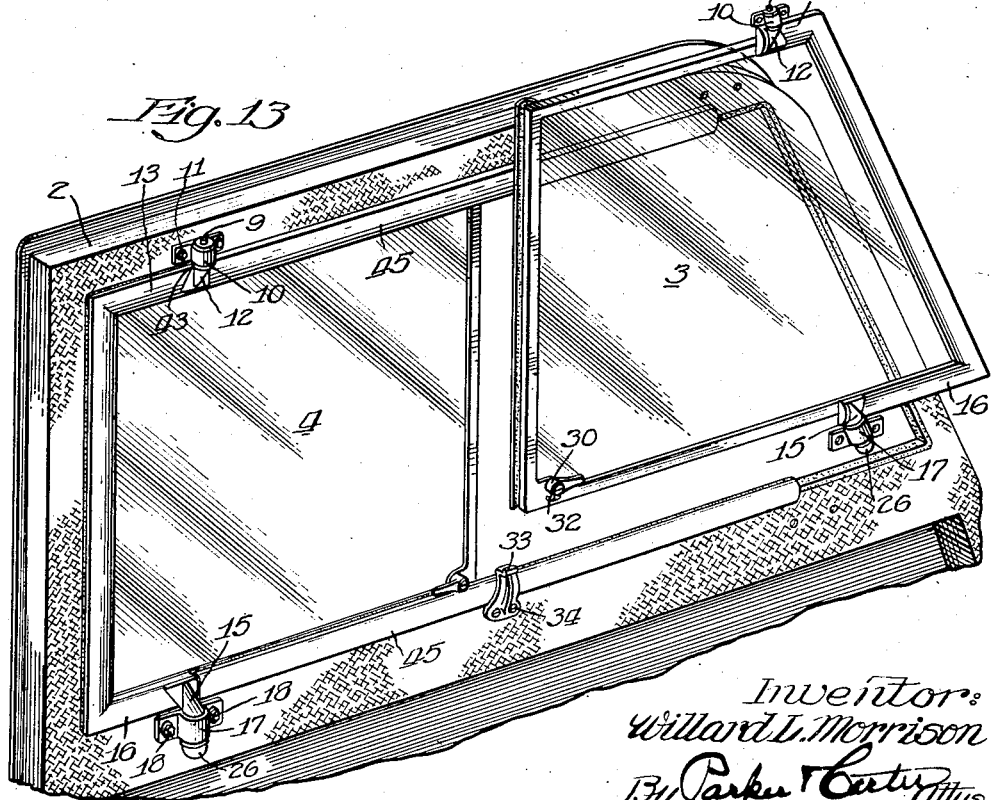
Inventor:
Willard L. Morrison
By Parker & Carter Attys.

Patented Apr. 26, 1938

2,115,036

UNITED STATES PATENT OFFICE 2,115,036

VENTILATING DEVICE FOR AUTOMOBILES

Willard L. Morrison, Chicago, Ill.

Application July 3, 1933, Serial No. 678,777

13 Claims. (Cl. 296—44)

This invention relates to ventilating devices for automobiles and has for its object to provide a new and improved device of this description. The invention has as a further object to provide a ventilating device for automobiles having deflector window sections pivotally mounted in the window opening, the pivots being located on the inside of the automobile. The invention has as a further object to provide a ventilating device for automobiles having window deflecting sections pivotally mounted in the window opening with a rubber seal completely surrounding the window opening and being free from any holes for the pivots. The invention has as a further object to provide a ventilating device for automobiles wherein there are pivoted window deflecting sections in the window opening and a complete unbroken seal extending entirely around the window opening. The invention has as a further object to provide a ventilating device for automobiles wherein there are window deflecting sections pivotally mounted in the window opening and substantially flush with the outer face of the automobile. The invention has other objects which are more particularly pointed out in the accompanying description.

Referring now to the drawings, Fig. 1 is a view showing an automobile embodying the invention;

Fig. 2 is an inside view of the upper part of the front door showing the deflector sections in position;

Fig. 3 is a sectional view taken on line 3—3 of Fig. 2;

Fig. 4 is an enlarged view similar to Fig. 3 showing the rear section and the sealing connection between the two sections;

Fig. 5 is a view showing the front deflecting section in an open position;

Fig. 6 is an enlarged view similar to Fig. 2 with parts broken away;

Fig. 7 is an enlarged sectional view taken on line 7—7 of Fig. 6;

Fig. 8 is an enlarged sectional view taken on line 8—8 of Fig. 6;

Fig. 9 is a top view of the upper pivot;

Fig. 10 is an enlarged sectional view taken on line 10—10 of Fig. 6;

Fig. 11 is a bottom view of the lower pivot;

Fig. 12 is a sectional view taken on line 12—12 of Fig. 6;

Fig. 13 is a perspective view of the inner face of the upper end of the front door showing the method of inserting the deflector sections in position;

Fig. 14 is a vertical sectional view with parts broken away showing a modified construction.

Like numerals refer to like parts throughout the several figures.

As illustrated in the drawings, I have shown an automobile 1 provided with my ventilating device. In this construction the front door 2 has the deflector sections 3 and 4. The window opening has a rubber seal extending entirely therearound and the pivots are arranged so that there is no opening in this seal required for such pivots. The pivots are offset and are on the inside of the automobile. The upper pivot 9 is mounted in a bearing 10 which is attached to the door by the fastening devices 11. This pivot is connected by a bent member 12 with the frame member 13 on the deflector section 4. The lower pivot 14 has connected therewith a bent section 15 which is connected with the frame member 16 at the bottom of the deflector section 4.

Attached to the inside of the door is a hollow bearing or member 17, said member being fastened by the fastening devices 18, see Fig. 6. The pivot 14 has an enlarged head 19 which fits into this hollow member. The hollow member has a hole in the bottom through which the end of the pivot projects, see Fig. 7. A spring 20 surrounds the pivot and has one end engaging the head 19 and the other end the bottom 21 of the hollow member 14. Friction washers 22 and 23 are preferably located one engaging the head 19 and the other the bottom 21. The pivot 14 is threaded at the end and a nut 24 is threaded thereon. The washer 25 is located between the nut and the bottom 21. When the nut is tightened the spring is compressed and friction is applied to resist the rotation of the window section. This friction may be adjusted to the desired amount to hold the window section in any desired position. A cover 26 is provided for the nut 24 and the washer 25 has the projections 27 which extend into recesses in this cover, as shown in Fig. 7.

It will be noted that the deflector section 4 is substantially flush with the outer face 28 of the automobile, as shown in Fig. 7. A locking device is provided for locking the deflector sections in their closed positions. This locking device consists of a rotating member 30 mounted on a pin 31 attached to the frame section 16 of the window, and it has a hook 32 which passes under a locking member 33 attached to the inside of the door by the fastening device 34, see Fig. 12. Some means is provided for holding the handle of the locking device in any position to which it is moved so that it cannot drop to interfere with the closing of the window or to strike the automobile and cause injury to the parts. In the construction shown this result is produced by providing a recess in the outer end of the rotatable part 30 and inserting a spring washer 30a in this recess. A screw 31a has a threaded connection with the pin 31 and has a large head which fits into this recess and which engages the spring washer 30a so as to clamp it between the rotatable part 30 and the head 31a of the screw. Since the part 30 rotates and the head of the screw does not rotate it will be seen that there is a frictional contact between them due to this spring washer which will hold the handle which is connected to the rotatable part 30 in any position to which it is moved. The offset pivot may be applied to the ordinary automobile window where the window is in the middle of the door. This construction is shown in Fig. 14 where the rubber seal 35 is placed in the reveal in the recess extending therearound and the window section 36 engages this seal. The upper pivot 37 is mounted in a bearing 38 on the inside and is connected by a member 39 with the window frame 40. In Fig. 13 I have illustrated the method of placing the deflecting sections in position.

I prefer to provide a non-metallic packing material 43 in the bearings 38 and 10 for the upper pivots so as to prevent rattling and so as to hold the parts in proper position. I also prefer to provide a sealing device 44 extending around the inside of the window so that when the deflector sections are closed they will be properly sealed. Any suitable device for this purpose may be used. In the construction herein shown I provide a bent metal holding member 45 which is attached in position about the window opening and in which the sealing member 44 is held, see Fig. 12.

It will be seen that all that is necessary in placing these deflector sections in position is to bring them into proper position with relation to the window opening and then fasten them in position by means of the fastening devices 11 and 18. It will further be seen that by means of this construction there is a sealing member extending entirely around the device and, as it were, forming the reveal of the window, and that the pivoted window is mounted therein without any holes or openings being made in the reveal of the sealing device, the window when in position being pivotally mounted so that it may be moved to any desired angular position and held in that position. It will further be seen that I provide here window deflecting sections mounted in the window opening which have their outer faces substantially flush with the outer face of the automobile or of the door thereof. It is also evident that the offset pivots may be made with or without the sealing device, or with any form of reveal and that when in position there will be nothing from the outside to show how the deflector sections are fastened in position and no marring of the exposed face of the automobile.

I claim:

1. A ventilating device for automobiles comprising a pivoted window section, a frame member therefor, a laterally extending member connected to the inner side of said frame member and extending inwardly beyond the inner wall of the automobile, and having its end substantially parallel with the face of the window section, and a pivot on said end.

2. A ventilating device for automobiles comprising a pivoted window section, a frame member therefor, a laterally extending member connected to the inner side of said frame member and extending inwardly beyond the inner wall of the automobile, and having its end substantially parallel with the face of the window section, and a pivot on said end, said pivot being substantially parallel with the face of said window section and a bearing for said pivot with means for fastening it to said inner wall of the automobile.

3. A ventilating device for automobiles comprising a pivoted window section, a frame member therefor, a laterally extending member connected to the inner side of said frame member and extending inwardly beyond the inner wall of the automobile, and having its end substantially parallel with the face of the window section, and a pivot on said end, one end of said pivot being enlarged, a bearing for said pivot into which said enlarged end projects, a spring on said bearing, and means for compressing said spring to provide friction means for resisting the rotation of the pivot.

4. A ventilating device for automobiles comprising a pivoted window section, an offset pivot connected with said pivoted window section and projecting inwardly therefrom, a bearing for said pivot adapted to be attached to the inner wall of the automobile and a sealing device connected with the inner wall of the automobile and extending along the edge of said window section so as to form a seal when the window section is closed.

5. A ventilating device for automobiles comprising a pivoted window section, an offset pivot connected with said pivoted window section and projecting inwardly therefrom, a bearing for said pivot adapted to be attached to the inner wall of the automobile and a sealing device connected with the inner wall of the automobile and extending along the edge of said window section so as to form a seal when the window section is closed, said sealing device acting also to limit the inward movement of the window section.

6. A ventilating device for automobiles having a window opening comprising a pivoted window section mounted within said window opening, a frame member thereon, an offset pivot connected with said frame member fixed against lateral movement with relation to the window opening and projecting therefrom inwardly beyond the inner edge of said window opening, a bearing for said pivot located on the interior of the automobile, and means for connecting the bearing with a fixed part of the automobile.

7. A ventilating device for automobiles having a window opening comprising a pivoted window section mounted within said window opening, a frame member thereon, an offset pivot connected with said frame member fixed against lateral movement with relation to the window opening and projecting laterally therefrom, a bearing for said pivot located on the interior of the automobile, means for connecting the bearing with a fixed part of the automobile, and a friction device associated with said bearing for resisting the pivotal movement of the window section.

8. A ventilating device for automobiles having a window opening comprising a pivoted window section mounted within said window opening, a frame member thereon, two offset pivots connected to said window section to opposite edges thereof, said offset pivots having laterally extending parts which extend inwardly beyond the inner edge of the window opening and which are bent in opposite directions near the inner edge of the opening, and bearings for said pivots adapted to be connected with a fixed part of the automobile extending about the window frame.

9. A ventilating device for automobiles comprising a portion of the automobile formed with a window opening provided with a window which completely closes the window opening when in closed position, said window comprising two sections in the same vertical plane when in their closed positions, one of said sections being a pivoted deflector window section pivotally mounted within the window opening and having its outer face substantially flush with the outer face of the automobile when in closed position.

10. A ventilating device for automobiles comprising a portion of the automobile formed with a window opening, a pivoted deflector window section mounted within the window opening and having its outer face substantially flush with the outer face of the automobile, said deflector window section having offset pivots with laterally and inwardly extending portions connected with the window sections and which project beyond the inner edge of the window opening, and bearings for said pivots connected with the inner vertical wall of the automobile surrounding the window opening.

11. In a vehicle body, a side panel having a window opening therein, and adjustable means associated with the panel for sealing and regulating the opening comprising a glass window structure adapted to be moved into a position sealing the opening with its outer surface substantially flush in a longitudinal direction with the adjacent outer surface of the panel.

12. In a motor vehicle, the combination of a panel having a window opening therein, sealing means on the panel adjacent the opening, and an adjustable transparent window structure associated with the panel to open and close the opening, the outer portion of the window structure being formed to fit into the panel opening substantially flush with the exterior surface of the panel and with the edge portions thereof in engagement with the sealing means.

13. In a vehicle body, the combination of a side panel having a window opening therein, and a glass structure in the opening comprising at least two sheets of glass with a joint structure between them providing substantially flush outer surfaces, said glass structure being arranged with its forward and rear edges so the joints are made with the panel at those edges, said forward and rear edges of the panel opening and glass structure being so formed that the outer surfaces of both are in the same plane, whereby wind noises at the several joints are eliminated.

WILLARD L. MORRISON.